United States Patent
Tanabe et al.

(10) Patent No.: US 12,394,449 B1
(45) Date of Patent: Aug. 19, 2025

(54) GUARD BAND ASSIGNMENT FOR SHINGLED MAGNETIC RECORDING

(71) Applicant: Western Digital Technologies, Inc., San Jose, CA (US)

(72) Inventors: Hiroyasu Tanabe, Fujisawa (JP); Masato Taniguchi, Fujisawa (JP); Mao Nishiyama, Fujisawa (JP); Xing Huo, Foothill Ranch, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/736,587

(22) Filed: Jun. 7, 2024

(51) Int. Cl.
G11B 20/12 (2006.01)
G11B 20/18 (2006.01)
G11B 27/10 (2006.01)

(52) U.S. Cl.
CPC .................... G11B 27/10 (2013.01)

(58) Field of Classification Search
CPC ....... G11B 5/012; G11B 5/09; G11B 5/59627; G11B 20/1217; G11B 2020/1238; G11B 2020/1292; G11B 5/54; G11B 20/18; G11B 20/1205; G11B 20/1209; G11B 2020/1247; G11B 5/58; G11B 20/12
USPC .......................................................... 360/48
See application file for complete search history.

(56) References Cited

U.S. PATENT DOCUMENTS

| | | |
|---|---|---|
| 8,908,310 B1 | 12/2014 | Bai et al. |
| 8,922,925 B1 | 12/2014 | Coker et al. |
| 9,117,488 B1 | 8/2015 | Pantel |
| 9,281,008 B1 | 3/2016 | Harlee, III et al. |
| 10,056,109 B2 * | 8/2018 | Liu .................. G11B 20/1816 |
| 2011/0304935 A1 | 12/2011 | Chang et al. |
| 2015/0116863 A1 | 4/2015 | Nagarajan et al. |
| 2016/0299698 A1 | 10/2016 | Hall |

OTHER PUBLICATIONS

Hajkazemi et al., "μCache: a mutable cache for SMR translation layer"; Nov. 2020; 28th International Symposium on Modeling, Analysis, and Simulation of Computer and Telecommunication Systems (MASCOTS).

* cited by examiner

Primary Examiner — Nabil Z Hindi
(74) Attorney, Agent, or Firm — Barry IP Law, P.C.

(57) ABSTRACT

A Data Storage Device (DSD) includes a disk for storing user data in tracks including sectors. Adjacent Track Interference (ATI) values are determined for annular locations along a guard band location designated to not store user data and to separate a first region of tracks from a second region of tracks. Based on the ATI values determined for the annular locations, guard band sectors are assigned from one or more adjacent tracks of the second region corresponding to one or more locations where the one or more adjacent tracks are deemed more susceptible to data corruption based on the determined ATI values. The assigned guard band sectors form part of the guard band. According to one aspect, the ATI values are determined based on at least one Magnetic Recording Metric (MRM) and a track pitch.

20 Claims, 9 Drawing Sheets

GUARD BAND ASSIGNMENT FOR SHINGLED MAGNETIC RECORDING

BACKGROUND

Data Storage Devices (DSDs) are often used to record data onto or to reproduce data from a storage media. One type of storage media includes a rotating magnetic disk, such as in a Hard Disk Drive (HDD). In such DSDs, a head is positioned in relation to a disk to magnetically read and write data in tracks on a surface of the disk.

The amount of data that can be stored on a disk surface in a given area (i.e., an areal density) generally continues to increase with each new generation of DSDs that use a disk to store data. In some cases, some or all of the tracks on a disk surface may be shingle written as overlapping tracks with Shingled Magnetic Recording (SMR) as a way of increasing the number of Tracks Per Inch (TPI) on the disk surface by making the tracks narrower. Since it is generally technologically easier to read narrow tracks than to write narrow tracks, SMR increases TPI by using a relatively wide shingle write head with a stronger magnetic field to overlap tracks like roof shingles. The non-overlapping portion then serves as a narrow track that can be read by a narrower read head. However, the overlapping of tracks in an SMR zone means that previously shingle written tracks cannot usually be modified or rewritten without affecting an adjacent track.

To address this issue, the overlapping tracks are written in zones or regions that are separated by guard bands where no data is written to allow for the regions to be rewritten without affecting other regions of overlapping tracks on the disk. However, the use of a stronger magnetic field when writing with narrower tracks worsens track interference problems, such as Adjacent Track Interference (ATI) and Wide Area Track Erasure (WATER), where writing data corrupts or erases data in nearby tracks causing errors when reading the earlier written data. In this regard, ATI and WATER can deteriorate or degrade data that is stored in an adjacent region of tracks due to rewriting a region, such as for a garbage collection operation to free up space storing obsolete data or for refreshing the data written in the region.

Other new technologies have been introduced or are in development to allow DSD heads to write more data in a given area using various energy-assisted recording techniques. Such energy-assisted recording techniques can include, for example, Thermal Fly-Height Control (TFC), Heat Assisted Magnetic Recording (HAMR), and Microwave Assisted Magnetic Recording (MAMR). Such technologies typically reduce the scale or physical size of the recorded data (e.g., smaller tracks) and can involve positioning the head closer to the disk surface, which can make the data more susceptible to ATI and WATER. In addition, HAMR and MAMR can temporarily decrease the magnetic coercivity (e.g., Hc) of the disk surface, which can increase the effect of ATI and WATER in nearby tracks.

As a result of the increasing areal density and the associated increase in track interference, DSDs may count the number of write operations performed in different regions of the disk surface. The data stored in a region is refreshed by being rewritten after a predetermined number of write operations have been performed in the region or in an adjacent region. In some cases, additional write operations may be blocked in the region until the region's data has been rewritten, which can delay the completion of the blocked write commands. The impact to performance caused by performing refreshes is particularly noticeable on DSDs that are more susceptible or more affected by track interference, such as in DSDs that have heads that use stronger magnetic fields to write data, use energy-assisted magnetic recording, and/or require a lower error tolerance, since these DSDs may generally require more frequent data refresh operations.

Some DSDs have also increased the width of guard bands between the regions to protect data from ATI and WATER. However, a disk surface may include, for example, thousands of regions separated by guard bands. Increasing the guard band width, such as from one track width to two track widths, can result in a significant decrease in data storage capacity for the disk surface due to the additional space consumed by guard bands. This decrease in data storage capacity is made worse for DSDs that include many disk surfaces for storing data, as is typically the case for modern HDDs.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environments

Figure 1:
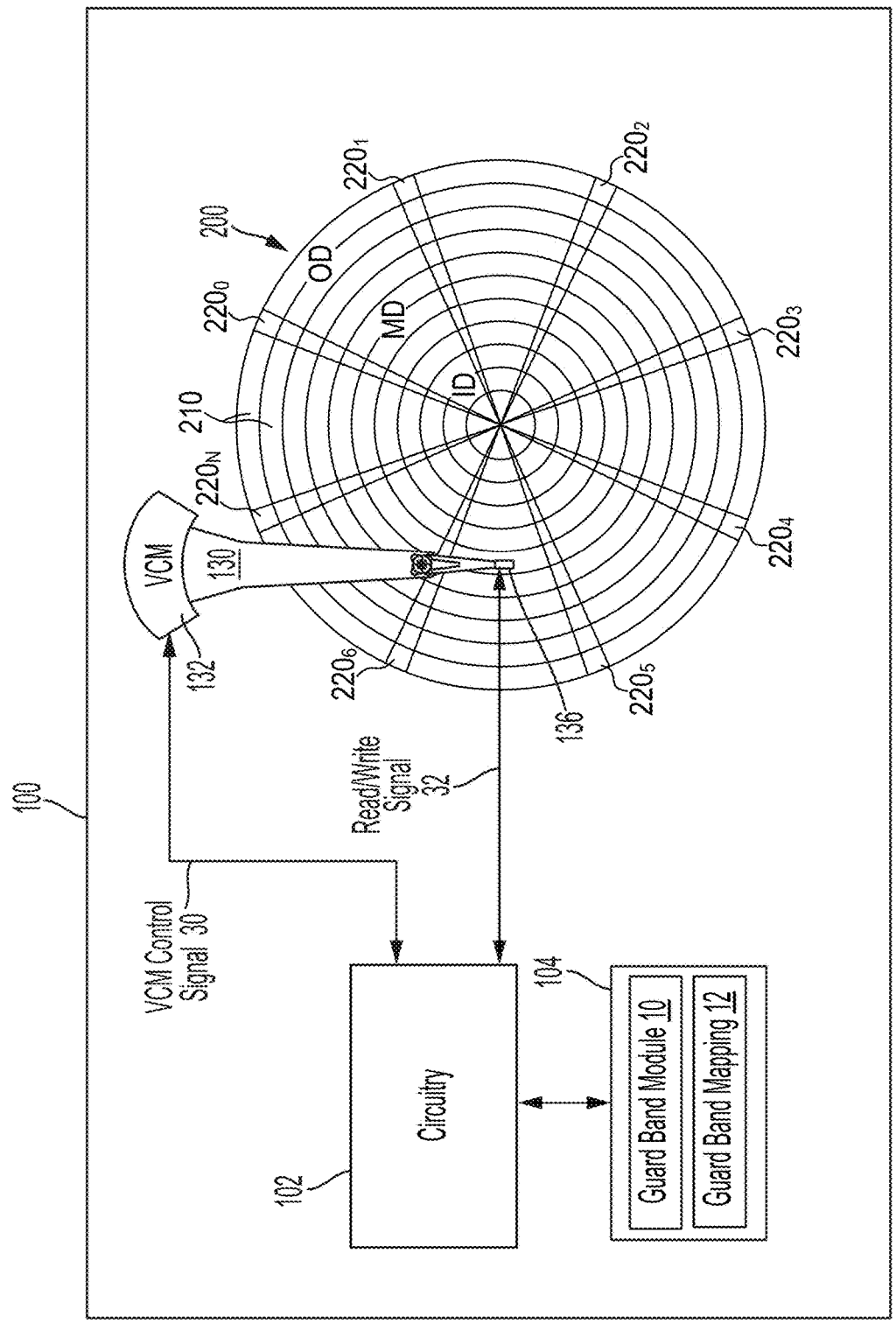
FIG. 1 is a block diagram of an example Data Storage Device (DSD) according to one or more embodiments.

FIG. 1 is a block diagram of an example Data Storage Device (DSD) 100 according to one or more embodiments. As shown in the example of FIG. 1, DSD 100 includes Non-Volatile Memory (NVM) in the form of magnetic disk 200. In this regard, DSD 100 may be considered a Hard Disk Drive (HDD) since it includes a rotating magnetic disk. In other embodiments, DSD 100 can include other NVM media in addition to disk 200 for data storage, such as flash memory or other non-volatile solid-state memory. In this regard, DSD 100 in FIG. 1 includes non-volatile solid-state memory 104.

As will be appreciated by those of ordinary skill in the art with reference to the present disclosure, disk 200 may form part of a disk pack including multiple disks that are circumferentially aligned with disk 200. In such implementations, head 136 may form part of a Head Stack Assembly (HSA) including heads arranged to read data from and write data to a corresponding disk surface in the disk pack. In this regard, head 136 can move in conjunction with another head under disk 200 to read and write data on a bottom surface of disk 200, and/or head 136 can move in conjunction with other heads for additional disks.

As shown in FIG. 1, disk 200 includes concentric regions 210 that each include multiple concentric tracks for storing data. In the example of FIG. 1, the regions 210 include overlapping or shingled tracks that have been written using Shingled Magnetic Recording (SMR). As noted above, the non-overlapping portions of the tracks serve as narrow tracks that can provide a higher data density on disk 200 in terms of Tracks Per Inch (TPI). The regions 210 are located across the disk surface, including an Inner Diameter (ID) portion of disk 200, a Middle Diameter (MD) portion of disk 200, and an Outer Diameter (OD) portion of disk 200. In some implementations, each region 210 can provide a predetermined data storage capacity, such as 128 Mebibytes (MiB) or 256 MiB of data.

The data read from disk 200 by head 136 is provided to circuitry 102 via read/write signal 32 and the data written to disk 200 by head 136 is provided from circuitry 102 to head 136 via read/write signal 32. Those of ordinary skill in the art will appreciate that the number of regions 210 shown in FIG. 1 is for the purposes of illustration and that disk 200 may include, for example, many more regions than shown in FIG. 1, such as thousands of regions or tens of thousands of regions.

Disk 200 also includes a plurality of angularly spaced servo wedges 2200 to 220N, each of which may include embedded servo information that can be read from disk 200 by head 136 to determine the position of head 136 over disk 200. For example, each servo wedge 220 may include a pattern of alternating magnetic transitions (i.e., a servo burst), which may be read from disk 200 by head 136 and processed by circuitry 102 to estimate the position of head 136 on disk 200. The angular spacing between servo wedges 220 may be uniform, as shown in the example of FIG. 1. As appreciated by those of ordinary skill in the art, each track may include, for example, over 100 servo wedges for positioning head 136.

Disk 200 is rotated by a spindle motor (not shown) and head 136 is positioned to read and write data on the surface of disk 200 using Voice Coil Motor (VCM) 132. In more detail, head 136 is connected to the distal end of actuator 130 which is rotated by VCM 132 to position head 136 over disk 200 to read or write data in annular tracks on disk 200. A servo system of circuitry 102 controls the position of head 136 using VCM control signal 30, which may include a control current.

In the example of FIG. 1, DSD 100 includes circuitry 102, which can include electronic components for performing different functions for operation of DSD 100, such as an interface controller, a Read/Write Integrated Circuit (R/W IC), an Arm-Electronics (AE) module, a motor driver, a servo processor, and other digital processors and associated memory. In this regard, circuitry 102 can include one or more processors for executing instructions, such as a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, circuitry 102 can include a System on a Chip (SoC), which may also include one or more memories of non-volatile solid-state memory 104 and/or other local memory such as a Dynamic Random Access Memory (DRAM), and/or an interface for communicating with a host. Some or all of circuitry 102 may be located on a Printed Circuit Board (PCB) of DSD 100.

Non-volatile solid-state memory 104 can include, for example, one or more flash memories and/or Read Only Memories (ROMs) that can be used for storing firmware or other code and/or data for execution by one or more processors of circuitry 102. While the description herein refers to solid-state memory generally, it is understood that solid-state memory may comprise one or more of various types of memory devices such as flash integrated circuits, Chalcogenide RAM (C-RAM), Phase Change Memory (PCM), Programmable Metallization Cell RAM (PMC-RAM), Ovonic Unified Memory (OUM), Resistive RAM (RRAM), NAND memory (e.g., Single-Level Cell (SLC) memory, Multi-Level Cell (MLC) memory, Triple-Level Cell (TLC) memory, or any combination thereof), NOR memory, Electronically Erasable Programmable ROM (EEPROM), Ferroelectric Memory (FeRAM), Magnetoresistive RAM (MRAM), 3D XPoint memory, other discrete NVM chips, or any combination thereof.

Data stored in memory 104 can include, for example, instructions loaded from guard band module 10 for execution by circuitry 102, and/or data used in executing guard band module 10 or other DSD firmware, such as guard band mapping 12. In the example of FIG. 1, guard band mapping 12 can identify guard band locations on disk 200 that separate regions 210 (e.g., guard band 212 in FIG. 2) and are designated to not store user data. As discussed above, guard bands can be used in some implementations to separate regions of overlapping tracks that use SMR to allow the regions of tracks to be rewritten without also rewriting tracks in an adjacent region 210.

As noted above, the use of a stronger magnetic field, such as with SMR, and/or the narrower tracks, which may also be written with smaller bits or grains on the disk, worsens track interference problems, such as Adjacent Track Interference (ATI) and Wide Area Track Erasure (WATER). ATI and WATER can deteriorate or degrade data that is stored in an adjacent region of tracks due to rewriting a region. Such deterioration or corruption typically occurs after a certain number of repeated writes to an adjacent region. In addition, certain newly developed energy-assisted magnetic writing technologies, such as Heat Assisted Magnetic Recording (HAMR) and Microwave Assisted Magnetic Recording (MAMR), can also temporarily reduce the magnetic coercivity (e.g., Hc) of the disk surface in adjacent tracks that can exacerbate ATI and WATER.

In response, some current DSDs may use a wider guard band that corresponds to multiple track widths to provide additional protection for the data in the adjacent region. However, as noted above, increasing the guard band width can significantly decrease the data storage capacity of the disk surface due to the additional space consumed by the guard bands. The present disclosure includes identifying localized areas along guard bands where one or more adjacent tracks may be more susceptible to ATI and/or WATER. Sectors are assigned from the one or more adjacent tracks to serve as guard band sectors that become part of the guard band, while other sectors in the one or more adjacent tracks that are less susceptible to data corruption remain designated for storing user data. This arrangement can provide improved protection against ATI and/or WATER without having to designate one or more full additional tracks as part of the guard band, thereby reducing the loss of data storage capacity of the disk surface.

In some implementations, guard band mapping 12 in FIG. 1 can identify the locations of guard bands using full guard band identifiers (e.g., track IDs) in addition to identifying the locations of guard band sectors in adjacent tracks using sector identifiers (e.g., sector IDs) that may add a wider guard band in localized annular areas or portions along the guard band where data is deemed to be more susceptible to ATI and/or WATER. In some implementations, guard band mapping 12 may also indicate the locations of the different regions 210 on disk 200. In other implementations, the identifiers for the guard band sectors may be stored in a separate data structure from the identifiers for the full track guard bands.

A data refresh process may be performed in a region 210 to rewrite data to ensure its integrity against magnetic fields that may inadvertently cause the erasure or degradation of data over time. The data stored in a region can be refreshed by being rewritten after a predetermined number of write operations have been performed in the region or in an adjacent region. As noted above, additional write operations may be blocked in the region until the region's data has been rewritten, which can delay the completion of the blocked write commands. The impact to Input/Output performance (e.g., Input/Output Operations Per Second (IOPS)) caused by performing refreshes can be particularly noticeable for DSDs that are more susceptible or more affected by track interference, such as in DSDs that have heads that use stronger magnetic fields to write data, use energy-assisted magnetic recording, and/or require a lower error tolerance, since these DSDs may generally require more frequent data refresh operations. Accordingly, the use of localized guard band sectors as disclosed herein can also improve I/O performance by reducing the frequency of refresh operations, especially for DSDs with a relatively large number of SMR regions.

Those of ordinary skill in the art will appreciate with reference to the present disclosure that other implementations of DSD 100 may differ. For example, NVM 104 in other implementations may be a volatile memory or the location of storing guard band module 10 and/or guard band mapping 12 may differ. As another example variation, other implementations may instead use a separate data structure for identifying guard band sectors or may instead map out such guard band sectors from tracks in a region to designate the guard band sectors as areas not to be used for storing user data.

Figure 2:
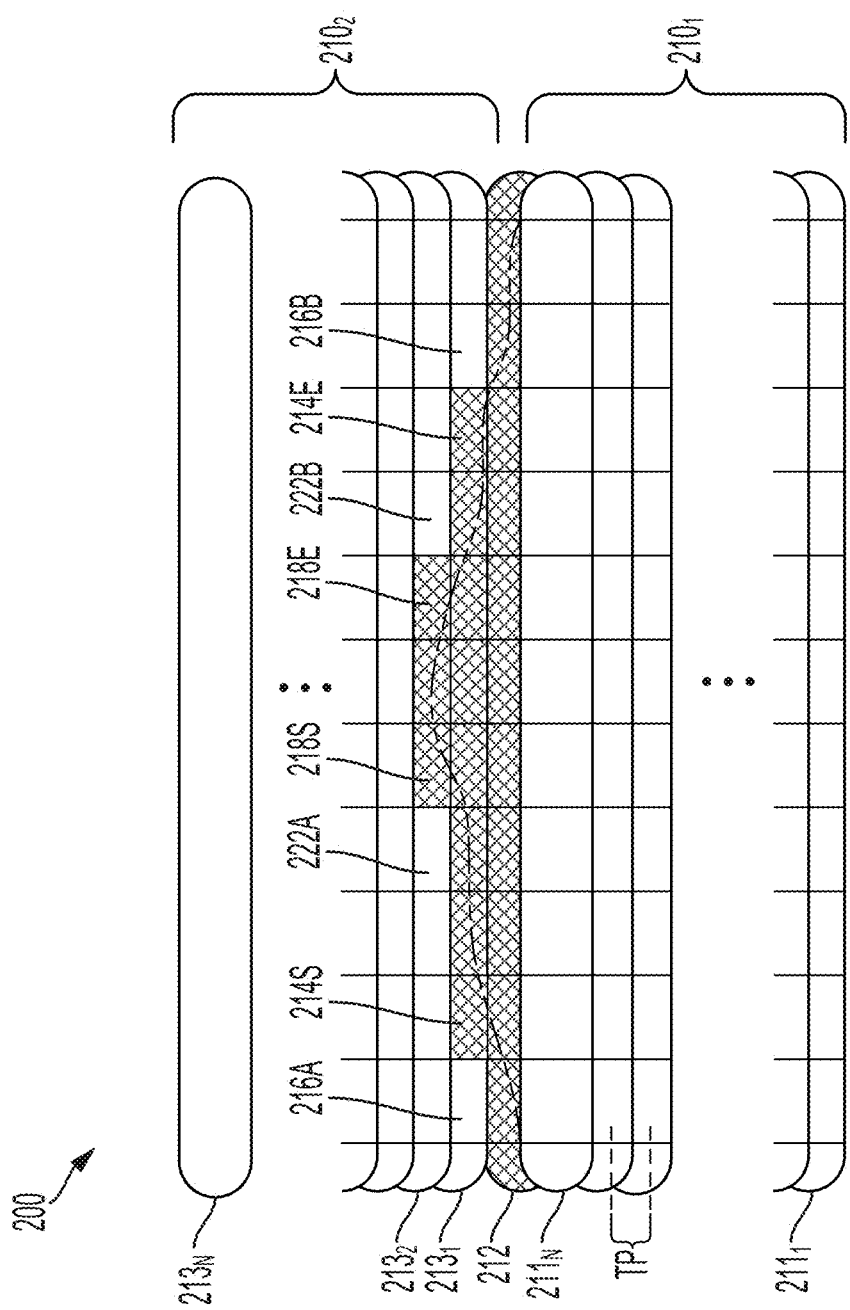
FIG. 2 is an example of two regions of tracks separated by a guard band including guard band sectors assigned from one or more adjacent tracks according to one or more embodiments.

FIG. 2 is an example of two regions $210_1$ and $210_2$ of overlapping tracks on a disk that are separated by guard band 212 according to one or more embodiments. Region $210_1$ includes tracks $211_1$ to $211_N$ that overlap with a track pitch shown in FIG. 2 as TP. The track pitch is defined as a distance between the centers of the non-overlapped portions of adjacent tracks. Region $210_2$ includes tacks $213_1$ to $213_N$ that overlap with the same track pitch as in region $210_1$. In other implementations, the track pitches for the zone may differ.

As shown in FIG. 2, each of regions $210_1$ and $210_2$ are written in the same cross-track direction within the regions. In other words, the tracks in region $210_1$ and $210_2$ are sequentially written in a direction from the bottom of FIG. 2 towards the top of FIG. 2. This sequential writing within the region can ensure that data is not overwritten since the overlap progresses in the same direction within the region. As noted above, a particular region may be rewritten, such as for garbage collection or for refreshing the data without overwriting the data in other regions. This rewriting of data may affect or lead to the corruption of data in an adjacent region caused by ATI or WATER. A previously written adjacent region may also be susceptible to ATI or WATER during an initial writing of a region.

In the example of FIG. 2, guard band 212 includes the cross-hatched sectors, which includes guard band sectors 214S to 214E and 218S to 218E assigned from adjacent tracks $213_1$ and $213_2$, respectively. Unlike conventional guard bands, guard band 212 includes guard band sectors from region $210_2$ that have been assigned based on at least one Magnetic Recording Metric (MRM) and/or ATI value determined for a plurality of annular locations along guard band 212. The direction of extension of guard band 212 may differ in another implementation where the direction of overlap of tracks is in the opposite direction, or as discussed in more detail below, where ATI and/or WATER is caused in an opposite direction. In such an example, guard band sectors may instead be assigned from track $211_N$ to be part of guard band 212. In some implementations, it is possible for guard band sectors to be assigned from adjacent tracks in both directions (i.e., on opposite sides of the guard band).

Notably, each of tracks $213_1$ and $213_2$ in region $210_2$ includes remaining data sectors such as 216A and 216B in track $213_1$ and data sectors 222A and 222B in track $213_2$ that are designated to store user data. As a result, much of the storage capacity of tracks $213_1$ and $213_2$ can remain unaffected, while widening guard band 212 at particular portions where data in adjacent tracks is more susceptible to ATI and/or WATER caused by writing data in region $210_1$. The additional protection provided by the localized widening of guard band 212 can still leave a large majority of data sectors in tracks $213_1$ and $213_2$ available for storing user data, which reduces any loss in data storage capacity caused by the additional guard band protection.

The localized wider guard band protection can also reduce the number of data refresh operations that may need to be performed in region $210_2$ to maintain the integrity of the data, thereby improving the I/O performance of the DSD in handling commands by freeing up processing time and memory that would otherwise be used to perform refresh operations for possibly many thousands or tens of thousands of regions on each disk surface of the DSD.

The MRM can include, for example, one or more of a Magnetic Core Width (MCW) value, a Magnetic Erase Width (MEW) value, a Magnetic Read Width (MRW) value, a Symbol Error Rate (SER) value, a Bit Error Rate (BER) value, a Signal to Noise Ratio (SNR) value, a Servo Variable Gain Amplifier (SVGA) value, an Over Write (OW) value, a Magnetic Write Width (MWW) value, and a Write and Erase Width (WEW) value. The MRM can be measured or determined by circuitry of the DSD (e.g., circuitry 102 in FIG. 1) using the head (e.g., head 136 in FIG. 1), such as via write and/or read elements, or one or more sensors on the head, such as an Embedded Contact Sensor (ECS).

In some implementations, circuitry of the DSD can determine an ATI value for annular locations along guard band 212, such as by writing and/or reading data in track $211_N$ or writing and/or reading non-user data in guard band 212, which may be performed before regions $210_1$ and $210_2$ are written with user data, such as during a disk formatting process performed by the manufacturer of the DSD. Each ATI value can be determined by the circuitry by at least in part dividing the MRM value for the location by a track pitch (e.g., TP in FIG. 2).

For example, an MCW value may be measured or determined at different locations along track $211_N$. One edge of the MCW can be represented in FIG. 2 by the long dashed curve extending into region $210_2$. The MCW value (i.e., the MRM value in this case) may then be divided by the TP to provide an ATI value representing the number of adjacent tracks, and any remaining fraction thereof, that the MCW extends into. A comparison can then be made for the different ATI values along the guard band to determine whether to assign guard band sectors from one or more adjacent tracks.

The ATI value or the MRM value can be compared to thresholds for determining whether to assign guard band sectors from one or more adjacent tracks. For example, a first threshold ATI value could be 1.7 such that if the MRM from writing data in track $211_N$ extends more than a distance of 0.7 times the TP into guard band 212, one or more guard band sectors from a first adjacent track (i.e., track $213_1$) are added to guard band 212 for the annular location. A second threshold ATI value of 2.7 can be used to compare the ATI value for the annular location and determine whether to add one or more guard band sectors from a second adjacent track (i.e., track $213_2$). In some implementations, this can continue to a third adjacent track (i.e., track $213_3$), or farther, by comparing a third threshold ATI value of 3.7 to the ATI value for the annular location to determine whether to add any guard band sectors from the third adjacent track in region $210_2$.

Those of ordinary skill in the art will appreciate with reference to the present disclosure that other implementations of the use of guard band sectors assigned from one or more adjacent tracks are possible. For example, the circuitry of the DSD may measure or determine the MRM at a limited number of locations along a track or guard band, such as for six annular locations, and then use blocks of sectors corresponding to one sixth of the sectors in the adjacent track. In such an example, a block of sectors can be assigned as guard band sectors if the MRM for the location is greater than or equal to a threshold MRM value. In this regard, the value for the track pitch or track width may be built into the threshold value used to determine whether to assign guard band sectors in some implementations.

As another example, an ATI value for an annular location may be calculated using the result of a weighted function of MRM values for the annular location. The result of the weighted function may then be divided by a track pitch to calculate the ATI value or the result of the weighted function may be compared to one or more threshold MRM values to determine whether to assign guard band sectors.

Figure 3C:
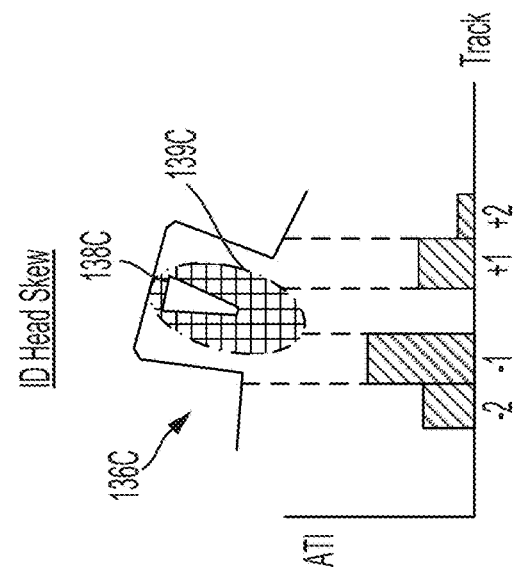
FIG. 3C is an example of ATI due to magnetic head skew at an Inner Diameter (ID) disk location according to one or more embodiments.
Figure 3B:
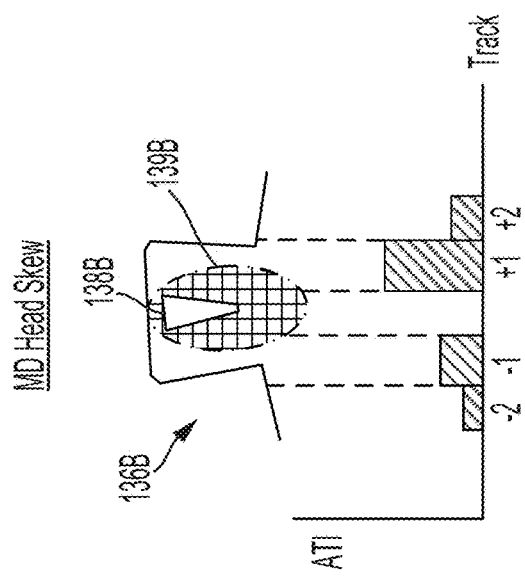
FIG. 3B is an example of ATI due to magnetic head skew at a Middle Diameter (MD) disk location according to one or more embodiments.
Figure 3A:
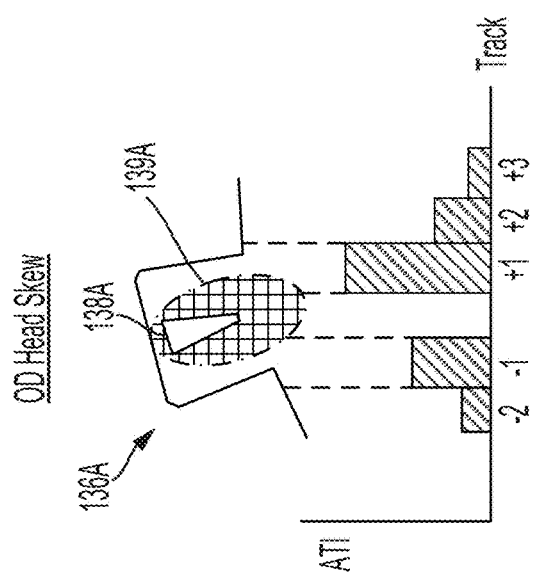
FIG. 3A is an example of Adjacent Track Interference (ATI) due to magnetic head skew at an Outer Diameter (OD) disk location according to one or more embodiments.

FIG. 3A is an example of ATI due to magnetic head skew at an OD disk location according to one or more embodiments. As shown in FIG. 3A, head 136A is skewed from left to right with respect to a horizontal disk surface indicated by the track axis. Magnetic field 139A is generated from main pole 138A of head 136A and forms recording bits by reversing or flipping the magnetization of magnetic regions (i.e., grains) on the disk. Head 136A has been positioned by an actuator (e.g., actuator 130 in FIG. 1) over a track directly beneath main pole 138A for magnetically writing data in the track. The tracks to the left and right of the intended track to be written (i.e., to the left and right of main pole 138A) are tracks that are written before or after the intended track has been written depending on the direction of cross-track overlap.

The skew, or non-parallel position of head 136A with respect to the disk surface, causes a generally non-perpendicular projection of magnetic field 139A with respect to the disk surface that causes a "fringing" magnetic field. In the example of FIG. 3A, this fringing magnetic field affects tracks on the disk surface more on the right side of the intended track to be written than on the left side of the intended track to be written. The higher level of ATI at an adjacent track corresponds to a lower number of repeated writes at the intended track that are needed to corrupt data in the adjacent track. This is shown in FIG. 3A with a higher level of ATI for the first immediately adjacent track in the positive direction or the right side (i.e., track+1 in FIG. 3A) than the level of ATI for the first immediately adjacent track in the negative direction or the left side (i.e., track−1 in FIG. 3A). This is also the case for the second adjacent track on the right side (i.e., track+2) having more ATI than the second adjacent track on the left side (i.e., track−2). In addition, a third adjacent track on the right side (i.e., track+3) is also affected by ATI due to writing on in the intended track.

If writing is performed sequentially in a track by track manner in a left to right direction with respect to the track axis in FIG. 3A, the overlap of the tracks when writing a new overlapping track can negate much of the ATI within the region of overlapping tracks by overwriting the ATI. In the example of FIG. 3A, this continues until reaching the last two tracks in the region, where the ATI may spill over or extend over a guard band and into the first two adjacent tracks of the next region, assuming the guard band is one track width. This may become an issue after repeated writes in the region if data is already written in the next region, such as when writing data in the region is a rewrite, as with a garbage collection operation to reclaim space storing obsolete data or to refresh the data stored in the region. Guard band sectors may then be assigned from the first adjacent track of the next region, and possibly from the second adjacent track, to reduce the effect of the ATI on the next region.

As discussed in more detail below, the amount of ATI is typically not consistent through the entire circumference of the track. The number of guard band sectors assigned from the first and/or second adjacent tracks of the next region may vary in location and quantity (i.e., length of the adjacent track), as discussed above with reference to FIG. 2 and with reference to FIG. 7 discussed below.

If writing is performed sequentially in a track by track manner in a right to left direction in FIG. 3A, the overlap of the tracks when writing a new overlapping track negates much of the ATI effect within the region of overlapping tracks. This continues in the example of FIG. 3A until reaching the last track in the region where the ATI may spill over or extend past a guard band and into the first adjacent track of the next region, assuming the guard band is one track width. Guard band sectors may then be assigned from the first adjacent track of the next region to reduce the effect of the ATI on the next region.

FIG. 3B is an example of ATI due to magnetic head skew at an MD disk location according to one or more embodiments. In contrast to the example of FIG. 3A at the OD disk location, the magnetic skew at the MD disk location is less with head 136B being more parallel to the disk surface, although not completely parallel to the disk surface. As shown in FIG. 3B, head 136B is skewed from slightly left to right with respect to a horizontal disk surface indicated by the track axis. Magnetic field 139B is generated from main pole 138B of head 136B for magnetically writing data in an intended track directly beneath main pole 138B.

The skew, or non-parallel position of head 136B with respect to the disk surface, causes a slightly non-perpendicular projection of magnetic field 139B with respect to the disk surface that affects tracks more on the right side of the intended track to be written than on the left side of the intended track to be written. This is shown in FIG. 3B with a higher level of ATI for the first immediately adjacent track in the positive direction or the right side (i.e., track+1 in FIG. 3B) than the level of ATI for the first immediately adjacent track in the negative direction or left side (i.e., track−1 in FIG. 3B). This is also the case for the second adjacent track on the right side (i.e., track+2) having slightly more ATI than the second adjacent track on the left side (i.e., track−2).

If writing is performed sequentially in a left to right direction with respect to the track axis in FIG. 3B, the overlap of the tracks when writing a new overlapping track may obviate much of the ATI within the region of overlapping tracks. This continues when writing in the region for the example of FIG. 3B until reaching the last two tracks in the region where the ATI may spill over or extend past a guard band and into the first adjacent track of the next region, assuming the guard band is one track width. This may become an issue if data is already written in the next region. Guard band sectors may then be assigned from the first adjacent track of the next region to reduce the effect of the ATI on the next region.

If writing is performed sequentially in a right to left direction in FIG. 3B, the overlap of the tracks when writing a new overlapping track may obviate much of the ATI effects within the region of overlapping tracks. This continues until reaching the last track in the region where a small amount of ATI may extend past a guard band and into the first adjacent track of the next region, assuming the guard band is one track width. In this case, guard band sectors may not be needed if the amount of ATI in the next region is below a threshold level that would require a relatively large number of repeated writes before causing data to become corrupted in the first adjacent track of the next region. In this regard, the effect of ATI is typically a cumulative effect where data becomes corrupted after repeated writing in an adjacent region or track.

FIG. 3C is an example of ATI due to magnetic head skew at an ID disk location according to one or more embodiments. Magnetic field 139C is generated from main pole 138C of head 136C for magnetically writing data in an intended track directly beneath main pole 138C. In contrast to the examples of FIGS. 3A and 3B at the OD and MD disk locations, respectively, the overall direction of the magnetic skew at the ID disk location is in the opposite direction (i.e., from right to left in FIG. 3C with respect to a horizontal disk surface indicated by the track axis).

The skew or non-parallel position of head 136C with respect to the disk surface causes a non-perpendicular projection of magnetic field 139C with respect to the disk surface that affects tracks on the disk surface more on the left side of the intended track to be written than on the right side of the intended track to be written. This is shown in FIG. 3C with a higher level of ATI for the first immediately adjacent track in the negative direction or the left direction (i.e., track−1 in FIG. 3C) than the level of ATI for the first immediately adjacent track in the positive direction or right direction (i.e., track+1 in FIG. 3C). This is also the case for the second adjacent track on the left side (i.e., track−2) having more ATI than the second adjacent track on the right side (i.e., track+2).

If writing is performed sequentially in a left to right direction with respect to the track axis in FIG. 3C, the overlap of the tracks when writing a new overlapping track can negate much of the ATI within the region of overlapping tracks until reaching the last track in the region. In the example of FIG. 3C, the ATI may spill over or extend past a guard band and into the first adjacent track of the next region, assuming the guard band is one track width. Guard band sectors may then be assigned from the first adjacent track of the next region to reduce the effect of the ATI or may not be assigned if the level of ATI is below a threshold level for assigning guard band sectors.

If writing is performed sequentially in a right to left direction in FIG. 3C, the amount of ATI is greater in this direction so more ATI may spill over or extend past a guard band and into the first adjacent track of the next region, and possibly into the second adjacent track of the next region, assuming the guard band is one track width. Guard band sectors may then be assigned from the first adjacent track of the next region and possibly from the second adjacent track of the next region to reduce the effect of the ATI in the next region.

Those of ordinary skill in the art will appreciate with reference to the present disclosure that FIGS. 3A to 3C are provided for illustrative purposes. In this regard, the number of adjacent tracks affected by ATI and the degrees of ATI may vary in other examples. The relative positions and/or scale of components shown in FIGS. 3A to 3C may also vary.

Figure 4C:
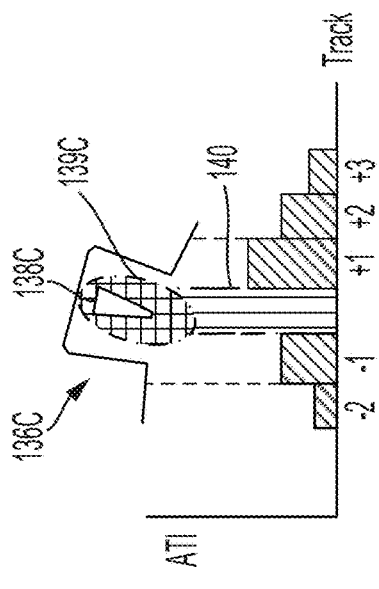
FIG. 4C is an example of ATI due to magnetic head skew and a thermal gradient from HAMR at an ID disk location according to one or more embodiments.
Figure 4B:
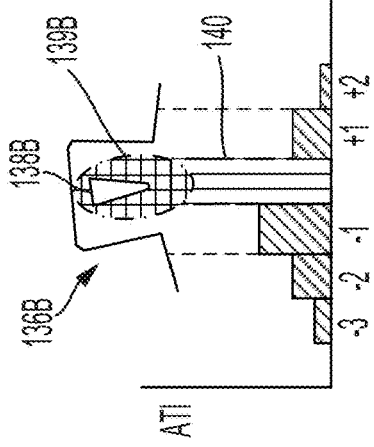
FIG. 4B is an example of ATI due to magnetic head skew and a thermal gradient from HAMR at an MD disk location according to one or more embodiments.
Figure 4A:
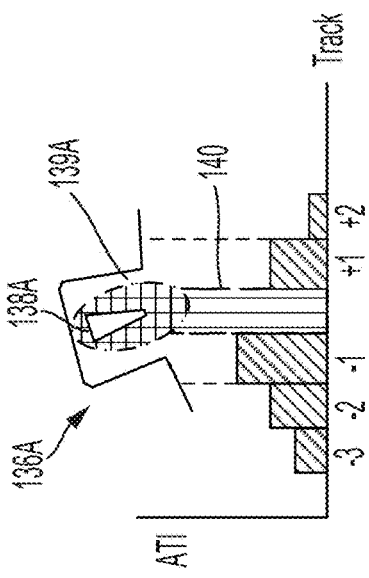
FIG. 4A is an example of ATI due to magnetic head skew and a thermal gradient from Heat Assisted Magnetic Recording (HAMR) at an OD disk location according to one or more embodiments.

FIG. 4A is an example of ATI due to magnetic head skew and a thermal gradient caused by the head using HAMR at an OD disk location according to one or more embodiments. As discussed above, HAMR is a relatively new technology being implemented in some modern DSDs to temporarily lower the magnetic coercivity of the disk surface by heating the disk surface during magnetic writing. When the disk surface cools, the magnetic coercivity returns to its original level, which enables magnetic writing at a smaller scale using smaller magnetic grains on the disk that otherwise could be unintentionally flipped or altered if the disk surface were to remain at the lower coercivity used during writing.

In addition to the magnetic head skew discussed above with reference to FIGS. 3A to 3C, there is a cross-track thermal gradient that can increase the effect of ATI since the magnetic coercivity of adjacent tracks can be temporarily lowered, thereby making the adjacent tracks more susceptible to being corrupted by the skewed magnetic field. In comparison to FIGS. 3A to 3C discussed above, FIGS. 4A to 4C include a thermal spot 140 that comes from a Near Field Transducer (NFT) of head 136 (not shown) that heats the disk surface.

As with the examples discussed above, one side of main pole 138 may be more affected by the combination of the thermal gradient and the magnetic head skew than the other side of main pole 138. The more affected side may be referred to as a "dirty side" and the less affected side may be referred to as a "clean side."

In the example of FIG. 4A, the dirty side is the left side of main pole 138A of head 136A where three tracks to the left of the intended track to be written are affected by ATI. The clean side in FIG. 4A is the right side of main pole 138A where only two tracks to the right of the intended track to be written are affected by ATI. The first two tracks to the right side of main pole 138A also have lower levels of ATI than their counterpart tracks on the left side of main pole 138A.

If writing in a right to left direction with respect to the track axis in FIG. 4A, guard band sectors may be assigned from the first adjacent track of an adjacent region to protect against the increased ATI on the left side of main pole 138A. One or more guard band sectors may also be assigned from a second adjacent track in the adjacent region as well. If writing in a left to right direction with respect to the track axis, guard band sectors may only be assigned from a first adjacent track in the adjacent region or perhaps no guard band sectors would be assigned if the ATI value for the location is below a threshold ATI value.

FIG. 4B is an example of ATI due to magnetic head skew and a thermal gradient caused by the head using HAMR at an MD disk location according to one or more embodiments. As with the example of the MD disk location discussed above for FIG. 3B, the MD disk location has generally less ATI than the OD disk location due to the lower amount of magnetic head skew. The dirty side is the left side of main pole 138B of head 136B where three tracks to the left of the intended track to be written are affected by ATI. The clean side in FIG. 4B is the right side of main pole 138B, where only two tracks to the right of the intended track to be written are affected by ATI. The first two tracks to the right side of main pole 138B also have lower levels of ATI than their counterpart tracks on the left side of main pole 138B.

If writing in a right to left direction with respect to the track axis in FIG. 4B, guard band sectors may be assigned from the first adjacent track of an adjacent region to protect against the increased ATI on the left side of main pole 138B if the level of ATI exceeds a threshold ATI value. If writing in a left to right direction with respect to the track axis, guard band sectors might not even be assigned from a first adjacent track in the adjacent region since the ATI of the second track on the clean side of main pole 138B is relatively low.

FIG. 4C is an example of ATI due to magnetic head skew and a thermal gradient caused by the head using HAMR at an ID disk location according to one or more embodiments. The dirty side in FIG. 4C has switched from the left side in FIGS. 4A and 4B to the right side in FIG. 4C. The dirty side is the right side of main pole 138C of head 136C where three tracks to the right of the intended track to be written are affected by ATI. The clean side in FIG. 4C is the left side of main pole 138C where only two tracks to the left of the intended track to be written are affected by ATI. The first two tracks to the left side of main pole 138C also have lower levels of ATI than their counterpart tracks on the right side of main pole 138C.

If writing in a right to left direction with respect to the track axis in FIG. 4C, guard band sectors might not be assigned from the first adjacent track of an adjacent region since the level of ATI is relatively low. If writing in a left to right direction with respect to the track axis, guard band sectors may be assigned from a first adjacent track in the adjacent region to protect against ATI if an ATI value or MRM value is greater than or equal to a threshold value. Guard band sectors from a second adjacent track in the adjacent region may or may not be assigned depending on the threshold value set for assigning guard band sectors in the second adjacent track.

The amount of ATI and/or WATER when using HAMR can depend on the condition of the NFT of the head and/or the irregularities in the slider body of the head and/or irregularities of the disk surface. In some cases, the thermal gradient of heat applied to the disk can have a relatively narrow focus, while other heads or other locations on a disk may have a wider range or surface distance for the thermal gradient.

Figure 5A:
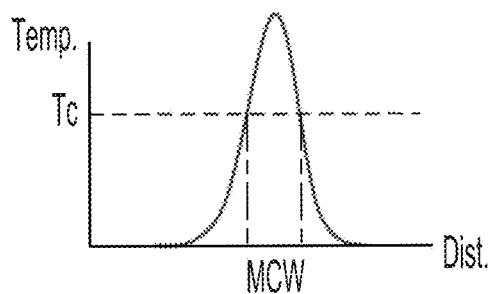
FIG. 5A illustrates a well-focused thermal gradient from HAMR according to one or more embodiments.
Figure 5B:
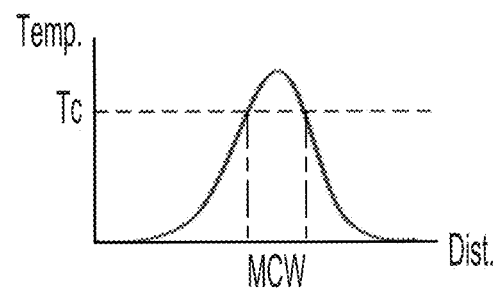
FIG. 5B illustrates a poorly focused thermal gradient from HAMR according to one or more embodiments.

In this regard, FIG. 5A illustrates a well-focused thermal gradient for HAMR, while FIG. 5B illustrates a comparatively poorly focused thermal gradient according to one or more embodiments. As shown in FIGS. 5A and 5B, the MCW of the head may be the same distance, but the thermal gradient in FIG. 5B is wider. This may be caused by, for example, a deterioration of the NFT over time that causes a rounding of the tip that generates the heat and/or differences in the manufacture of one head to another head, and/or differences in one portion of a disk surface to another disk surface portion (e.g., different amounts of sputter film deposited on the portions). The wider thermal gradient can lower the magnetic coercivity of adjacent tracks even though the temperature does not reach the Curie temperature (i.e., Tc in FIGS. 5A and 5B) where the disk surface loses its magnetic moment. Even a relatively small reduction in the magnetic coercivity of adjacent tracks can increase the amount of ATI. Accordingly, the width of guard bands and the assignment of guard band sectors may depend in some implementations on more than an MCW or MEW of the head.

Those of ordinary skill in the art will appreciate with reference to the present disclosure that other examples of ATI caused by the combination of magnetic head skew and different HAMR thermal gradients or "heat spots" may vary in practice. In this regard, the location of the dirty side, the number of adjacent tracks affected by ATI, and the degrees of ATI may vary in different implementations. In addition, the relative positions and/or scale of components shown in FIGS. 4A to 4C may vary.

Figure 6A:
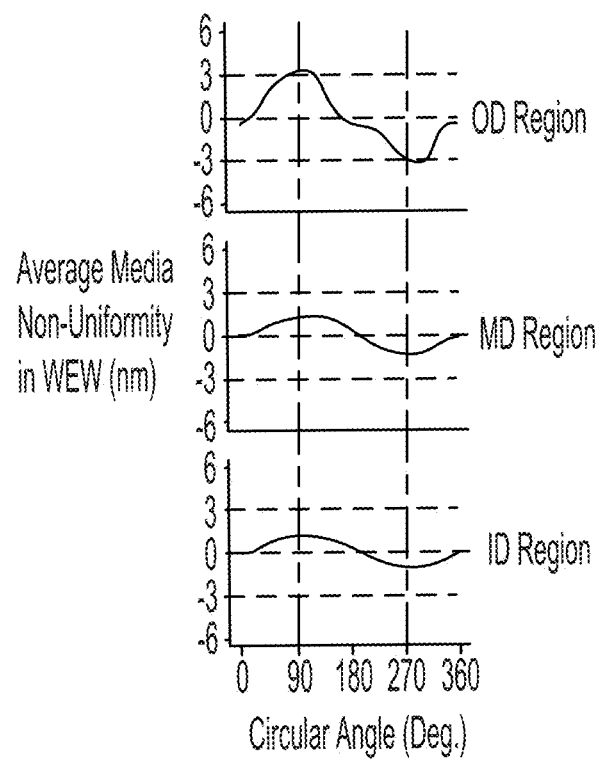
FIG. 6A illustrates an example of average magnetic media non-uniformities for tracks in an OD region, an MD region, and an ID region according to one or more embodiments.

FIG. 6A illustrates an example of average magnetic media non-uniformities for tracks in an OD region, an MD region, and an ID region according to one or more embodiments. As shown in FIG. 6A, three different regions are compared in terms of average media non-uniformity around the circumference of its tracks. The non-uniformity is measured in terms of WEW for the tracks in each region through a complete revolution of the disk. The media non-uniformity can represent different magnetic coercivities in different portions of the disk, which affect the ease at which data is magnetically recorded at the different disk locations. Areas on the disk with a lower magnetic coercivity are more susceptible to ATI and WATER than other areas on the disk that have a higher magnetic coercivity since the lower coercivity areas can be more easily affected by magnetic fields.

In some cases, the media non-uniformity can be caused by a "sputter shadow" created by sputtering claws that hold the disk during manufacture as sputtering film is deposited onto the disk surface. For example, the sputtering film thickness at or around the portions where the sputtering claws hold the disk, typically near the OD of the disk, may be different from the sputtering film thickness on other disk portions (i.e., portions where deposition is not partially blocked by the sputtering claws). In other words, the disk surface in the vicinity of the prongs or sputtering claws may be magnetically different or have a different coercivity than other portions of the disk surface. In some cases, areas of different coercivity may be located some distance inward from the OD of the disk, for instance, at the portions where the sputtering claws or prongs physically contact or hold the disk. For example, three sputtering claws may be used during the sputtering film deposition process. In such examples, the disk may include three distinct areas (referred to as "sputter shadow areas" or "pin shadows") having a different magnetic coercivity as compared to other areas of the disk.

The media at or around the pin shadows may be "magnetically soft" as compared to the media on other portions of the disk. While the media in the pin shadows is easier to write to, it is also more susceptible to the degradation of data stored in such areas due to ATI and/or WATER.

As shown in FIG. 6A, an average WEW of slightly greater than 3 nanometers (nm) occurs around 90 degrees in the OD region, and an average WEW of approximately-3 nm occurs around 270 degrees in the OD region. This can represent circumferential areas of the OD region that may be more susceptible to ATI or WATER, as compared to a circumferential location closer to 180 degrees, which has a narrower WEW of approximately 0 nm. Guard band sectors may therefore be assigned from an adjacent track in a next region corresponding to the higher WEW annular locations to protect against the wider WEW caused by the non-uniformity in the coercivity of the disk surface.

In contrast, the average media non-uniformities of both the MD region and the ID region are lower and therefore may not have guard band sectors assigned from an adjacent track in an adjacent region since ATI or WATER is less likely with the lower values of WEW for the same magnetic field. In this regard, the determination of whether to assign or add guard band sectors from an adjacent track can involve the consideration of multiple MRMs, such as an WEW value and an MCW value. In some implementations, the different MRM values for an annular location can be combined into a single ATI value for comparison to a threshold ATI value. In other implementations, individual MRM values may be compared to respective threshold MRM values for an annular location such that any one of the MRM values for the location can trigger the assignment of one or more guard band sectors in the adjacent track.

Figure 6C:
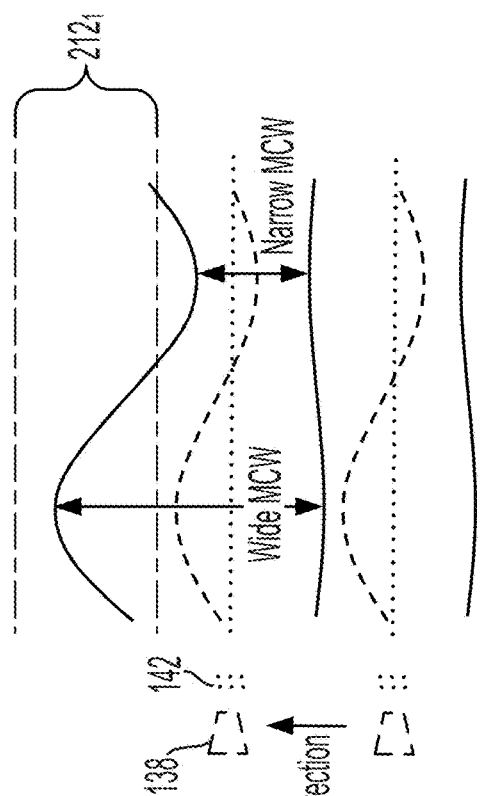
FIG. 6C illustrates the effect of write position adjustment on MCW values along the track of FIG. 6B according to one or more embodiments.
Figure 6B:
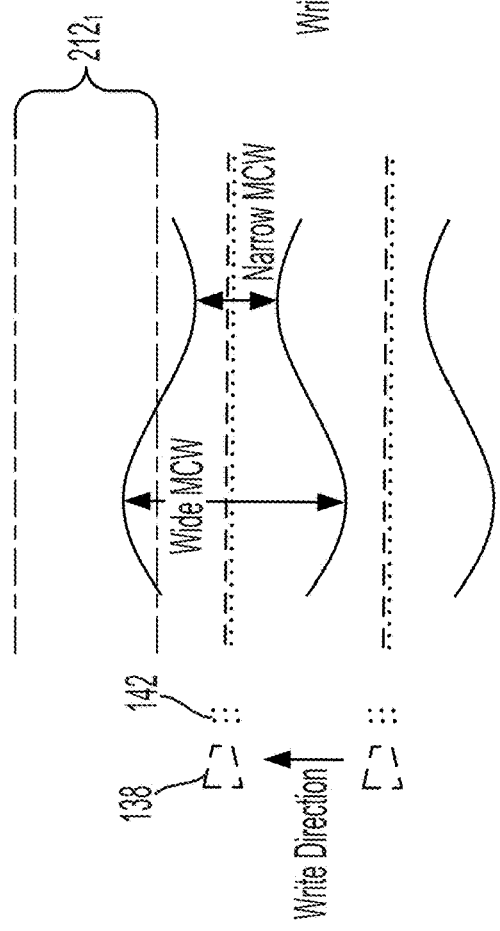
FIG. 6B illustrates varying Magnetic Core Width (MCW) values along a track due to a media non-uniformity according to one or more embodiments.

FIG. 6B illustrates varying MCW values along a track due to a media non-uniformity according to one or more embodiments. As shown in FIG. 6B, the MCW of a head can vary along the track with a wide MCW at some portions of the track and a comparatively narrow MCW at other portions of the same track. The variation in MCW can result from the differences in magnetic coercivity along the track, such as due to irregularities in sputter film thickness.

The trajectory of main pole 138 of a head is shown in FIG. 6B with a dashed line and the trajectory of read element 142 of the head is shown with a dotted line. As writing progresses from one track to the next in a direction from the bottom of FIG. 6B toward the top of FIG. 6B, the track overlap creates a curved track pattern. Guard band $212_1$ in FIG. 6B has a width of one track pitch and separates the region from an adjacent region. In some implementations, the MCW in FIG. 6B does not extend far enough into guard band $212_1$ to warrant the assignment of guard band sectors from an adjacent track in the adjacent region, even at the widest MCW for the track.

However, the DSD may attempt to mitigate the effects of the varying MCW or the media non-uniformity by adjusting the trajectory of the head and its main pole when writing data so that the resulting overlapping tracks are more in line with a read trajectory along the center of the track. FIG. 6C illustrates the effect of such write position adjustment on the MCW values along the track of FIG. 6B according to one or more embodiments.

As shown in FIG. 6C, the bottom track has a less wavy or straighter profile compared to the example of FIG. 6B due to the main pole following a more curved write trajectory that partially cancels out the curved MCW along the bottom edge of the track profile. However, this write trajectory mitigation increases the area covered by the MCW along the top edge of the profile. Within a region of overlapping tracks, this may not be a problem since the tracks are overlapped. After reaching the last track in the region (i.e., the top track in FIG. 6C), the MCW along the top edge extends much farther into guard band $212_1$, which can cause more ATI and WATER as compared to the unmitigated write trajectory of FIG. 6B. Accordingly, guard band sectors can be assigned from a first track in the adjacent region corresponding to the widest MCW location in light of the change in MCW caused by the write trajectory mitigation.

Those of ordinary skill in the art will appreciate with reference to the present disclosure that the examples of FIGS. 6A to 6C are for illustrative purposes and that other examples are possible. For example, the average magnetic media non-uniformities for tracks in the regions shown in FIG. 6A may have a different pattern at different annular locations or for different region radial locations. In addition, the relative positions and scale of the tracks, guard band, and trajectories of FIGS. 6B and 4C may vary in other examples.

Figure 7:
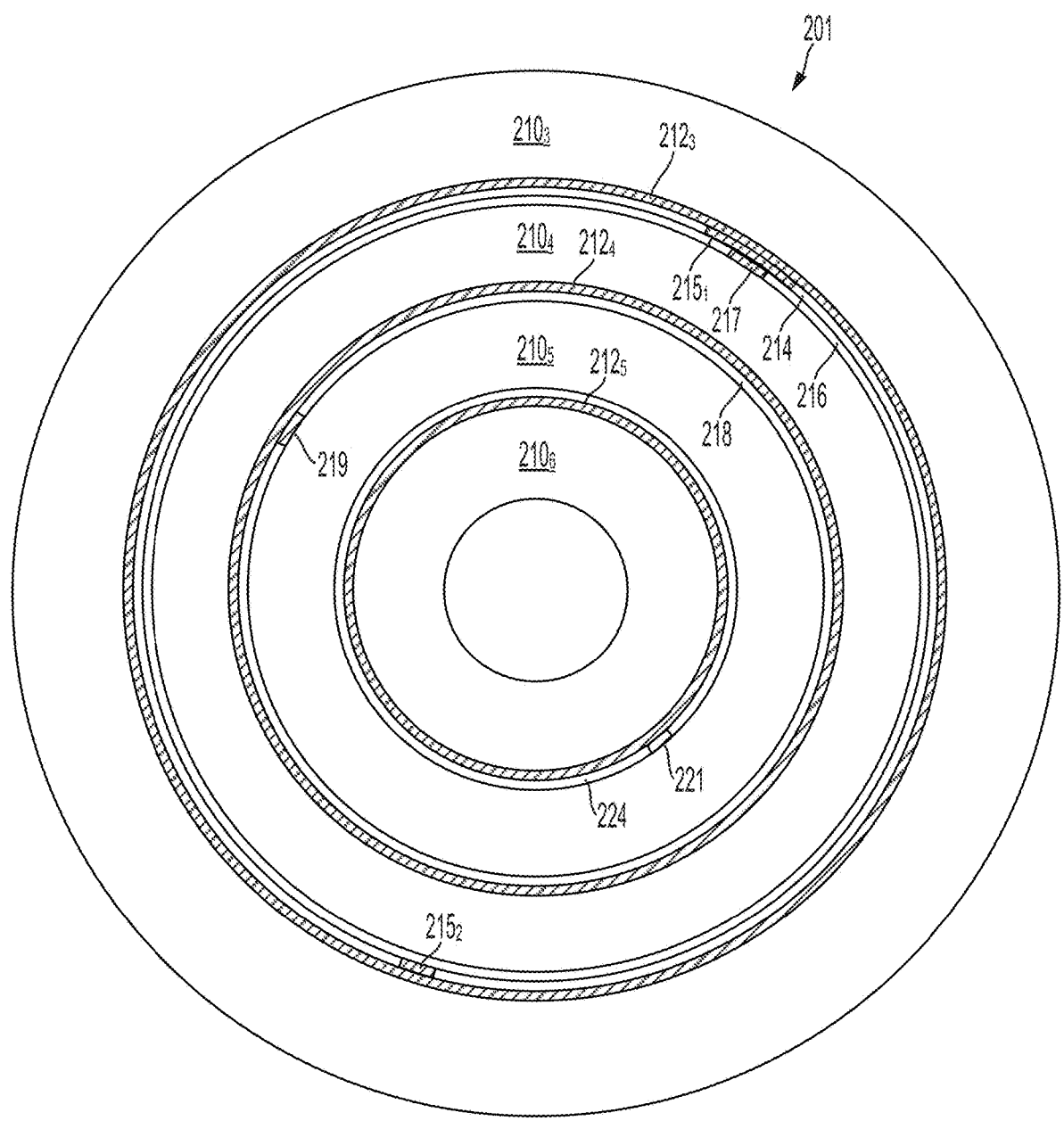
FIG. 7 is an example of guard band sector assignment for three guard bands according to one or more embodiments.

FIG. 7 is an example of guard band sector assignment for three guard bands according to one or more embodiments. As shown in the example of FIG. 7, each of regions $210_4$ and $210_5$ on disk 201 have guard band sectors assigned from its tracks to a guard band 212 between the region and an adjacent region. In the case of region $210_4$, groups of guard band sectors $215_1$ and $215_2$ are assigned from track 214 to protect against ATI or WATER caused by writing in region $210_3$, particularly from writing in one or more tracks of region $210_3$ that are closest to guard band $212_3$. In addition, a group of guard band sectors 217 is assigned from track 216 of region $210_5$ to further protect against ATI or WATER at its annular location.

In the example of FIG. 7, writing may begin in region $210_3$ and progress in a generally OD to ID direction toward region $210_5$ with overlapping SMR tracks. As discussed above, the relatively wide magnetic field for SMR writing may extend into, and possibly, past guard band $212_3$ in certain localized annular portions along guard band $212_3$.

Contiguous groups of guard band sectors $215_1$, $215_2$, and 217 are assigned based on at least one MRM determined at these annular locations along guard band $212_3$. In some implementations, the at least one MRM may be compared to at least one threshold value for determining whether to assign guard band sectors from one or more adjacent tracks in a next region. In other implementations, the at least one MRM or a weighted function of MRMs may be divided by a track pitch for the guard band and/or the next region to determine an ATI value that is then compared to one or more ATI value thresholds for determining whether to assign guard band sectors from one or more adjacent tracks in the next region. The ATI value may be determined using the track pitch in some implementations where the track pitch may vary from one guard band to another or may vary from one region to another.

Since the MRMs or ATI values can differ along a guard band 212, the contiguous annular positions of guard band sectors, such as the positions of guard band sectors $215_1$ and $215_2$, for example, can vary from region to region and even vary for a single region, such as region $210_4$. In addition, the length or number of guard band sectors forming such contiguous annular groups of guard band sectors can also vary for a given region and/or from one region to another.

In the case of region $210_5$, a group of guard band sectors 219 is assigned from track 218 to protect against ATI or WATER caused by writing in region $210_4$, particularly from writing in one or more tracks of region $210_4$ that are closest to guard band $212_4$. In addition, a group of guard band sectors 221 is assigned from track 224 in region $210_5$ to protect against ATI or WATER from writing in region $210_6$, particularly from writing in one or more tracks of region $210_6$ that are closest to guard band $212_5$. Notably, guard band sectors 221 are on an opposite side of guard band $212_5$ (i.e., the OD side of guard band $212_5$), as compared to guard band sectors $215_1$, $215_2$, 217, and 219, which are on an ID side of their respective guard bands 212. This can be due to, for example, changes in the magnetic head skew at the more ID location of region $210_6$ and/or variations in the magnetic coercivity of the disk surface, such as those caused by MAMR, HAMR, or media modulation (e.g., sputter film irregularities).

Guard band sectors 219 and 221 are assigned based on at least one MRM determined at these annular locations along guard bands $212_4$ and $212_5$, respectively. In some implementations, the at least one MRM may be compared to at least one threshold value for determining whether to assign guard band sectors from one or more adjacent tracks in a next region. In other implementations, the at least one MRM may be divided by a track pitch for the guard band and/or the next region to determine an ATI value that is then compared to one or more ATI value thresholds for determining whether to assign guard band sectors from one or more adjacent tracks in the next region. The ATI value may be determined using the track pitch in some implementations where the track pitch may vary from one guard band to another or may vary from one region to another.

Those of ordinary skill in the art will appreciate with reference to the present disclosure that the example of FIG. 7 is for illustrative purposes. Accordingly, disk 201 may include many more regions, guard bands, and groups of guard band sectors than shown in FIG. 7. In addition, the various annular locations of guard band sectors in FIG. 7 may vary in practice due to, for example, conditions of the media, operation of the head, and/or variations in disk formatting in terms of guard band sizes, track pitches, and directions of track overlap.

Example Processes

Figure 8:
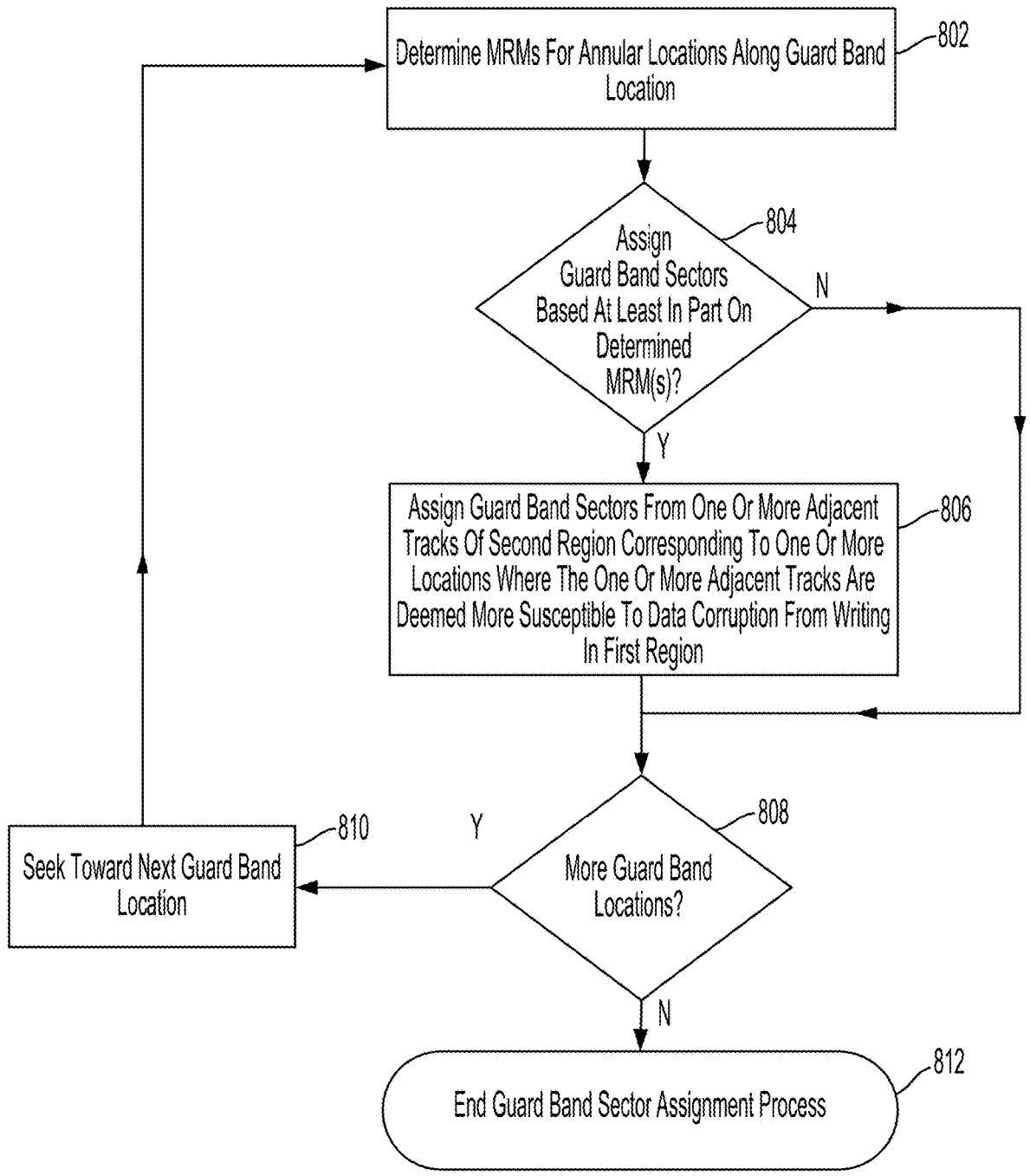
FIG. 8 is a flowchart for a guard band sector assignment process according to one or more embodiments.

FIG. 8 is a flowchart for a guard band sector assignment process according to one or more embodiments. The process of FIG. 8 can be performed by, for example, circuitry 102 of DSD 100 executing guard band module 10 in FIG. 1. In this regard, circuitry 102 can, in some implementations, comprise a means for performing the functions of the guard band sector assignment process of FIG. 8. In some implementations, the process of FIG. 8 may be performed as part of a disk formatting process by a manufacturer before or after guard bands are actually formed on the disk. In other implementations, the process of FIG. 8 may be performed in the field as the disk is being written with user data and after an initial designation of the guard bands.

In block 802, the circuitry determines MRMs for annular locations along a guard band location. In some implementations, this can include measuring or determining values such as an MCW value, an MEW value, an MRW value, an SER value, a BER value, an SNR value, an SVGA value, an OW value, an MWW value, and/or a WEW value for a track adjacent or near a guard band to be written, a guard band already written, or within the guard band itself. The MRMs are determined or measured at multiple locations along the guard band location, such as at eight different locations, for example. In other examples, an MRM may result from a continuous signal that changes along the guard band location and the circuitry may identify the annular locations, such as by a sector ID, where the MRM may exceed, fall below, or equal a threshold metric value.

In block 804, the circuitry determines whether to assign guard band sectors from one or more adjacent tracks of a second region based at least in part on the MRMs determined in block 802. In some implementations, the MRMs may be used to determine ATI values for different annular locations, such as by dividing each of the MRMs, or correlated disk surface distances for the MRMs, by a track pitch for the second region or for the guard band. The ATI value may then be compared to one or more threshold ATI values that each determine whether to assign guard band sectors from respective tracks in the next region. In other implementations, such as where the track pitch may remain constant across the disk surface or across a group of regions on the disk surface, the determined MRMs may be compared to one or more threshold MRM values that each determine whether to assign guard band sectors from respective tracks in the next region.

Each annular location may use a single MRM or may use multiple MRMs for the location in determining whether to assign guard band sectors. For example, multiple MRMs for an annular location may be used to calculate a weighted MRM value that represents the multiple MRMs. The weighted MRM value may then be compared to a threshold MRM value or divided by a track pitch to determine an ATI value for the annular location that is compared to a threshold ATI value. In another example, multiple MRMs may be determined for each annular location and separately compared to different threshold MRM values to determine whether to assign guard band sectors.

If it is determined not to assign guard band sectors in block 804, the process proceeds to block 808 by skipping block 806. In such cases, the MRMs may indicate that there is not a sufficient risk of data deteriorating from ATI or WATER in an adjacent region or that such a risk of data corruption is relatively low, such as when the MRMs or derived ATI value is less than a threshold MRM value or threshold ATI value.

If it is determined to assign guard band sectors in block 804, the circuitry in block 806 assigns the guard band sectors from the one or more adjacent tracks of a second region corresponding to one or more locations where the one or more adjacent tracks are deemed more susceptible to data corruption due to writing data in a first region. The assignment of the guard band sectors are based at least in part on the determined MRMs. An indication of the assigned guard band sectors can be stored in a NVM memory of the DSD (e.g., in guard band mapping 12 in FIG. 1) in some implementations.

In some cases, the first region may be a current region where the MRMs are determined, and the second region can be an adjacent region to be written next. In other cases, the first region may be the next region to be written and can be adjacent to a current region where the MRMs are determined. For example, with reference to FIG. 7, MRMs may be determined in a last written track of region $210_4$ adjacent to guard band $212_4$ that result in guard band sectors 219 being assigned from a next to be written region $210_5$ due to ATI or WATER in an OD direction. However, MRMs may also be determined in region $210_5$ adjacent to guard band $212_5$ that result in guard band sectors 221 being assigned from the same region $210_5$ due to ATI or WATER in an ID direction. In addition, and as noted above, the MRMs and the assignment of guard band sectors may be performed by a DSD manufacturer before user data is written on the disk surface in the field.

In block 808, it is determined if there are more guard band locations on the disk or more guard bands to be evaluated for adding guard band sectors. If so, the process proceeds to block 810 to seek the head toward the next guard band location and returns to block 802 to determine MRMs for annular locations for the next guard band location.

If there are not more guard band locations to evaluate in block 808, the guard band sector assignment process ends in block 812. In some cases, the guard band sector assignment process of FIG. 8, or portions thereof, may be repeated at different times throughout the operation of the DSD. For example, blocks 802 and 804 may be repeated after rewriting a region of tracks after a predetermined period of operation. The updating or redetermination of MRMs throughout the operable life of the DSD can, in some cases, identify changes to the susceptibility of data to ATI or WATER over time that may be caused by changes in the head and/or disk media.

In one such example, the thermal gradient of an HAMR head may expand over time as an NFT of the head deteriorates and becomes more rounded. This expansion of the thermal gradient can increase the likelihood of ATI or WATER and certain guard bands may benefit from adding guard band sectors to protect against this increased risk at certain annular locations along the guard band.

Those of ordinary skill in the art will appreciate with reference to the present disclosure that other ways of assigning guard band sectors are possible. For example, some implementations of a guard band sector assignment process may include determining whether a predetermined period of time has elapsed since a last determination of MRMs for a particular guard band, region, or group of guard bands or regions before redetermining or updating the MRMs for the particular guard band, region, or group of guard bands or regions. In such an implementation, the process may end without determining whether there are more guard band locations in block 808 and seeking toward a next guard band location in block 810.

Figure 9:
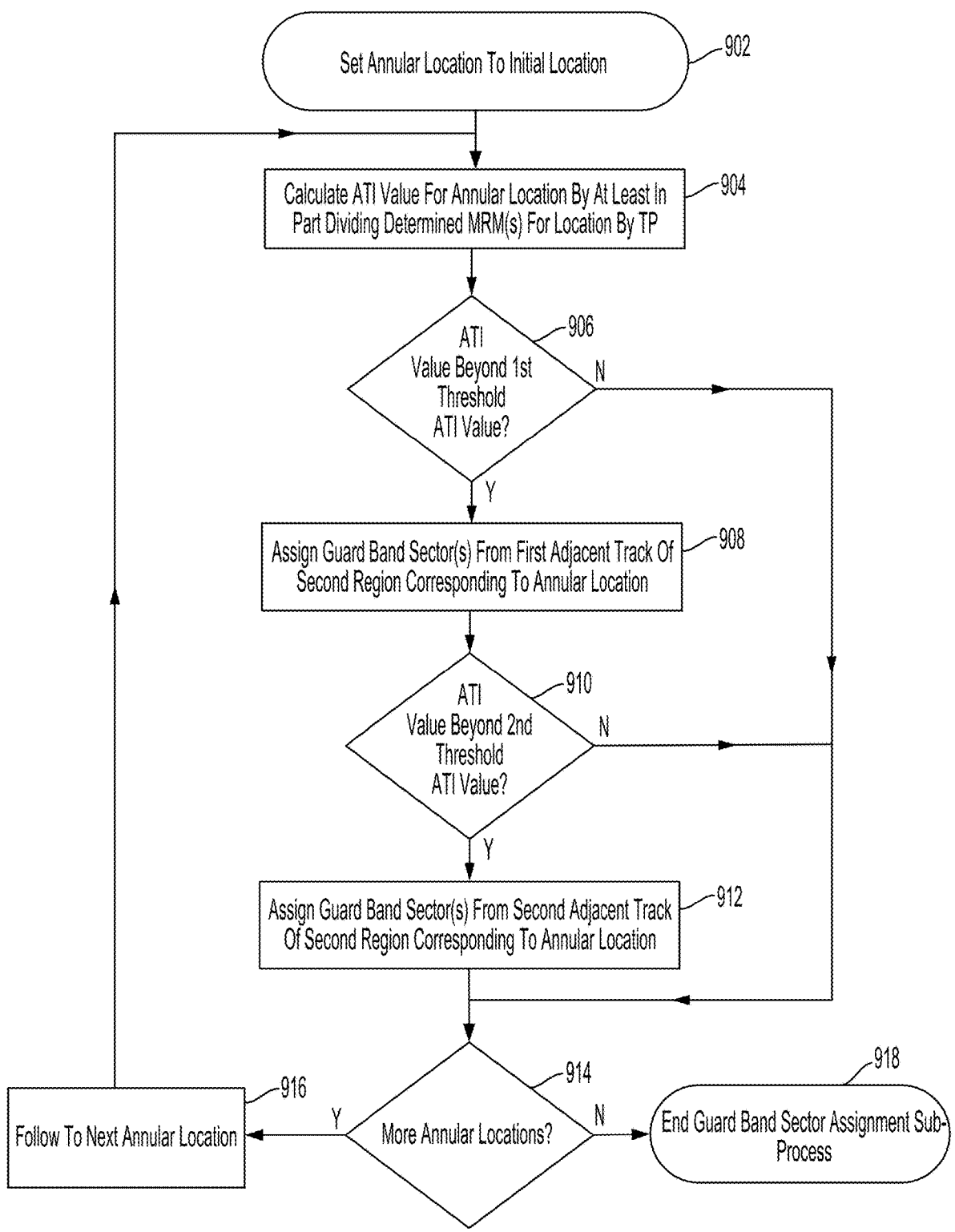
FIG. 9 is a flowchart for a guard band sector assignment sub-process according to one or more embodiments.

FIG. 9 is a flowchart for a guard band sector assignment sub-process according to one or more embodiments. The sub-process of FIG. 9 can be performed by, for example, circuitry 102 of DSD 100 executing guard band module 10 in FIG. 1. In this regard, circuitry 102 can, in some implementations, comprise a means for performing the functions of the guard band sector assignment sub-process of FIG. 9. In some implementations, the sub-process of FIG. 9 may form part of the guard band sector assignment process of FIG. 8 discussed above, such as where the process of FIG. 9 forms part of blocks 802 to 806 in FIG. 8 for the determination of MRMs for a guard band location, the determination on whether to assign guard band sectors for the guard band location, and the assignment of guard band sectors for such a guard band location.

In block 902, an annular location is set to an initial location. This may correspond to identifying a particular sector, such as by using a sector ID, in a track that is adjacent to a guard band location or forms part of a guard band.

In block 904, the circuitry calculates an ATI value for the annular location by at least in part dividing one or more determined MRMs for the annular location by a track pitch (i.e., TP in block 904). The track pitch can be used in a current region adjacent to the guard band location or may be a track pitch used or to be used for the guard band or in another region adjacent to the guard band. In some implementations, multiple MRMs may be used at each annular location and individually checked to determine if a resulting ATI value exceeds or is beyond a threshold ATI value. Other implementations may use a single MRM at the annular location to calculate the ATI value or may use a weighted function to calculate the ATI value.

In block 906, it is determined whether the calculated ATI value is beyond a first threshold ATI value. The first threshold ATI value can correspond to a threshold at which guard band sectors are to be assigned from a first adjacent track closest to the guard band. In some implementations, the ATI value can be compared to a first lower threshold ATI value and to a first upper threshold ATI value such that an ATI value less than the first lower threshold ATI value results in the assignment of guard band sectors from an adjacent track in a first radial direction and an ATI value greater than the first upper threshold ATI value results in the assignment of guard band sectors from an adjacent track in an opposite radial direction. In other words, the determination in block 906 may be to determine whether the calculated ATI value is within a particular range. Outside of the range, guard band sectors can be assigned from a closest adjacent user data track in a direction indicated by whether the ATI value is less than the first lower threshold ATI value or greater than the first upper threshold ATI value.

If the ATI value is not beyond the first threshold ATI value in block 906, the process proceeds to block 914 to determine if there are more annular locations to be evaluated for ATI. If so, the head follows to a next annular location in block 916 and the process returns to block 904 to calculate an ATI value for the next annular location. If there are not more annular locations to be evaluated for ATI in block 914, the process ends in block 918. In some implementations, each guard band may have a predetermined number of annular locations to be evaluated, which may vary from an ID region guard band to an OD region guard band.

On the other hand, if the ATI value in block 906 is beyond the first threshold ATI value, the circuitry assigns one or more guard band sectors from a first adjacent track of a second region corresponding to the annular location. The second region is a region of user data tracks that can be affected by ATI or WATER from writing in an adjacent first region of user data tracks. In some cases, the second region can correspond to the region where the ATI values are calculated for the annular locations. In other cases, the second region can correspond to a different region from where the ATI values are calculated such that the annular locations for calculating the ATI values are from a first region where the writing may create ATI or WATER for the data in the second region.

The guard band sectors are assigned based on the annular location where the ATI value is beyond the first threshold ATI value. In some implementations, a predetermined number of sectors in the first adjacent track may correspond to an annular location, such that an ATI value beyond the first threshold ATI value results in the predetermined number of guard band sectors being assigned from the first adjacent track. For example, each annular location may correspond to eight sectors such that an ATI value beyond the first threshold ATI value results in eight guard band sectors being assigned from the first adjacent track with the annular location generally centered along the eight guard band sectors.

In block 910, it is determined whether the calculated ATI value is beyond a second threshold ATI value that is greater in magnitude than the first threshold ATI value. The second threshold ATI value can correspond to a threshold at which guard band sectors are to be assigned from a second adjacent track that is next to the first adjacent track but farther from the guard band. In some implementations, the ATI value can be compared to a second lower threshold ATI value and to a second upper threshold ATI value such that an ATI value less than the second lower ATI threshold value results in assignment of guard band sectors from a second adjacent track in a first radial direction and an ATI value greater than the second upper ATI threshold value results in assignment of guard band sectors from a second adjacent track in the opposite radial direction. In other words, the determination in block 910 may be to determine whether the calculated ATI value is within a particular range. Outside of the range, guard band sectors can be assigned from a second farthest user data track in a direction indicated by whether the ATI value is less than the second lower threshold ATI value or greater than the second upper threshold ATI value.

If the ATI value is not greater than or equal to the second threshold ATI value in block 910, the process proceeds to block 914 to determine if there are more annular locations to be evaluated for ATI. If so, the head follows to a next annular location in block 916 and the process returns to block 904 to calculate an ATI value for the next annular location. If there are not more annular locations to be evaluated for ATI in block 914, the process ends in block 918.

On the other hand, if the ATI value in block 910 is greater than or equal to the second threshold ATI value, the circuitry assigns one or more guard band sectors from a second adjacent track of a second region corresponding to the annular location. The second region is a region of user data tracks that can be affected by ATI or WATER from writing in an adjacent first region of user data tracks. In some cases, the second region can correspond to the region where the ATI values are calculated for the annular locations. In other cases, the second region can correspond to a different region from where the ATI values are calculated such that the annular locations for calculating the ATI values are from the first region where the writing may create ATI or WATER for the data in the second region.

The guard band sectors are assigned based on the annular location where the ATI value is beyond the second threshold ATI value. In some implementations, a predetermined number of sectors in the second adjacent track may correspond to an annular location, such that an ATI value beyond the second threshold ATI value results in the predetermined number of guard band sectors being assigned from the second adjacent track. The process then proceeds to block 914 to determine if there are more annular locations to be checked for ATI.

Those of ordinary skill in the art will appreciate with reference to the present disclosure that other implementations of the guard band sector assignment sub-process of FIG. 9 may differ. For example, in some implementations the calculated ATI value may be compared to a third threshold ATI value for possible assignment of guard band sectors from a third adjacent track farther from the guard band and/or comparison to a fourth ATI value for possible assignment of guard band sectors from a fourth adjacent track even farther from the guard band.

The foregoing assignment of guard band sectors from an adjacent region of tracks can improve the protection of data against ATI and/or WATER, which is becoming increasingly important in light of the smaller scale of writing on disks and new technologies such as HAMR and MAMR that temporarily reduce the magnetic coercivity of the disk surface. Instead of adding complete additional guard band tracks, the present disclosure can enable a more fine-tuned adjustment of guard band widths in portions along the guard band location to conserve data storage capacity by retaining sectors within the track that are less susceptible to data corruption.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
   a disk configured to store data;
   a head configured to write user data on the disk in tracks including sectors; and
   circuitry configured to:
      determine Magnetic Recording Metrics (MRMs) using the head for a plurality of annular locations along a guard band location on the disk, wherein the guard band is designated to not store user data and to separate a first region of tracks from a second region of tracks; and
      based at least in part on the MRMs determined for the plurality of annular locations, assign guard band sectors from one or more adjacent tracks of the second region corresponding to one or more annular locations of the plurality annular locations where the one or more adjacent tracks are deemed more susceptible to data corruption based on the determined MRMs, wherein the assigned guard band sectors form part of the guard band.

2. The DSD of claim 1, wherein the circuitry is further configured to:
   determine MRMs for annular locations along different tracks for a plurality of guard bands on the disk; and
   assign respective guard band sectors for different guard bands in one or more different adjacent tracks of a respective adjacent region of tracks based on the determined MRMs for the annular locations along the different tracks.

3. The DSD of claim 2, wherein the number of respective guard band sectors assigned for a first guard band of the plurality of guard bands differs from the number of respective guard band sectors assigned for a second guard band of the plurality of guard bands.

4. The DSD of claim 2, wherein a first contiguous annular position of first guard band sectors assigned for a first guard band of the plurality of guard bands differs from a second contiguous annular position of second guard band sectors assigned for a second guard band of the plurality of guard bands.

5. The DSD of claim 1, wherein the determined MRMs include at least one of a Magnetic Core Width (MCW) value, a Magnetic Erase Width (MEW) value, a Magnetic Read Width (MRW) value, a Symbol Error Rate (SER) value, a Bit Error Rate (BER) value, a Signal to Noise Ratio (SNR) value, a Servo Variable Gain Amplifier (SVGA) value, an Over Write (OW) value, a Magnetic Write Width (MWW) value, and a Write and Erase Width (WEW) value.

6. The DSD of claim 1, wherein the circuitry is further configured to store an indication of the assigned guard band sectors from the one or more adjacent tracks in a non-volatile memory of the DSD.

7. The DSD of claim 1, wherein the circuitry is further configured to:
   calculate an Adjacent Track Interference (ATI) value for each of the plurality of annular locations along the guard band by at least in part dividing an MRM by a track pitch;
   for each of the plurality of annular locations, determine whether a respective ATI value is beyond a first threshold ATI value; and
   assign first adjacent track guard band sectors from a first adjacent track of the second region corresponding to first annular locations of the plurality annular locations where the respective ATI value is beyond the first threshold ATI value.

8. The DSD of claim 7, wherein the circuitry is further configured to:
   for each of the first annular locations, determine whether the respective ATI value is beyond a second threshold ATI value, wherein the second threshold ATI value is greater in magnitude than the first threshold ATI value; and
   assign second adjacent track guard band sectors from a second adjacent track of the second region corresponding to one or more of the first annular locations where the respective ATI value is beyond the second threshold ATI value, wherein the second adjacent track is farther from the guard band than the first adjacent track and is next to the first adjacent track.

9. A method performed by a Data Storage Device (DSD) including a disk configured to store user data in tracks including sectors, the method comprising:
   determining Adjacent Track Interference (ATI) values for a plurality of annular locations along a guard band location on the disk based at least in part on a track pitch of a plurality of tracks, wherein the guard band is designated to not store user data and to separate a first region of tracks from a second region of tracks; and
   based at least in part on one or more determined ATI values, assigning guard band sectors from one or more adjacent tracks of the second region corresponding to one or more annular locations of the plurality annular locations where the one or more adjacent tracks are deemed more susceptible to data corruption based on the determined ATI values, wherein the assigned guard band sectors form part of the guard band.

10. The method of claim 9, further comprising:
    determining the ATI values for annular locations along different guard bands of a plurality of guard bands on the disk; and
    assigning respective guard band sectors for the different guard bands in one or more different adjacent tracks of a respective adjacent region of tracks based on the determined ATI values for the annular locations along the different tracks.

11. The method of claim 10, wherein the number of respective guard band sectors assigned for a first guard band of the plurality of guard bands differs from the number of respective guard band sectors assigned for a second guard band of the plurality of guard bands.

12. The method of claim 10, wherein a first contiguous annular position of first guard band sectors assigned for a first guard band of the plurality of guard bands differs from a second contiguous annular position of second guard band sectors assigned for a second guard band of the plurality of guard bands.

13. The method of claim 9, wherein the determined ATI values are based on at least one of a Magnetic Core Width (MCW) value, a Magnetic Erase Width (MEW) value, a Magnetic Read Width (MRW) value, a Symbol Error Rate (SER) value, a Bit Error Rate (BER) value, a Signal to Noise Ratio (SNR) value, a Servo Variable Gain Amplifier (SVGA) value, an Over Write (OW) value, a Magnetic Write Width (MWW) value, and a Write and Erase Width (WEW) value.

14. The method of claim 9, further comprising storing, in a non-volatile memory of the DSD, an indication of the assigned guard band sectors from the one or more adjacent tracks.

15. The method of claim 9, wherein the determined ATI values are based on a Magnetic Core Width (MCW) value or a Magnetic Erase Width (MEW) value, and wherein the method further comprises:
   calculating an ATI value for each of the plurality of annular locations along the guard band by at least in part dividing the MCW value or the MEW value for the annular location by the track pitch;
   for each of the plurality of annular locations, determining whether a respective ATI value is beyond a first threshold ATI value; and
   assigning first adjacent track guard band sectors from a first adjacent track of the second region corresponding to first annular locations of the plurality annular locations where the respective ATI value is beyond the first threshold ATI value.

16. The method of claim 15, further comprising:
   for each of the first annular locations, determining whether the respective ATI value is beyond a second threshold ATI value, wherein the second threshold ATI value is greater in magnitude than the first threshold ATI value; and
   assigning second adjacent track guard band sectors from a second adjacent track of the second region corresponding to one or more of the first annular locations where the respective ATI value is beyond the second threshold ATI value, wherein the second adjacent track is farther from the guard band than the first adjacent track and is next to the first adjacent track.

17. A Data Storage Device (DSD), comprising:
   a disk configured to store data;
   a head configured to write user data on the disk in tracks including sectors; and
   means for:
      determining at least one Magnetic Recording Metric (MRM) using the head for each of a plurality of annular locations along a guard band location on the disk, wherein the guard band is designated to not store user data and to separate a first region of tracks from a second region of tracks; and
      based at least in part on the at least one MRM determined for each of the plurality of annular locations, assigning guard band sectors from one or more adjacent tracks of the second region corresponding to one or more annular locations of the plurality annular locations where the one or more adjacent tracks are deemed more susceptible to data corruption based on the determined MRMs, wherein the assigned guard band sectors form part of the guard band.

18. The DSD of claim 17, further comprising means for:
   determining the at least one MRM for annular locations along different guard bands for a plurality of guard bands on the disk; and
   assigning respective guard band sectors for the different guard bands in one or more different adjacent tracks of a respective adjacent region of tracks based on the determined MRMs for the annular locations along the different guard bands.

19. The DSD of claim 17, wherein the at least one MRM includes a Magnetic Core Width (MCW) value or a Magnetic Erase Width (MEW) value, and wherein the DSD further comprises means for:
   calculating an Adjacent Track Interference (ATI) value for each of the plurality of annular locations along the guard band by at least in part dividing the at least one MRM by a track pitch;
   for each of the plurality of annular locations, determining whether a respective ATI value is beyond a first threshold ATI value; and
   assigning first adjacent track guard band sectors from a first adjacent track of the second region corresponding to first annular locations of the plurality annular locations where the respective ATI value is beyond the first threshold ATI value.

20. The DSD of 19, further comprising means for:
   for each of the first annular locations, determining whether the respective ATI value is beyond a second threshold ATI value, wherein the second threshold ATI value is greater in magnitude than the first threshold ATI value; and
   assigning second adjacent track guard band sectors from a second adjacent track of the second region corresponding to one or more of the first annular locations where the respective ATI value is beyond the second threshold ATI value, wherein the second adjacent track is farther from the guard band than the first adjacent track and is next to the first adjacent track.

* * * * *